US012763697B2

(12) United States Patent
Pevere et al.

(10) Patent No.: US 12,763,697 B2
(45) Date of Patent: Oct. 13, 2026

(54) POWER CONVERTER WITH BALANCER INCLUDING FLYING CAPACITOR

(71) Applicant: Infineon Technologies Austria AG, Villach (AT)

(72) Inventors: Alessandro Pevere, Villach (AT); Alex Pacini, Villach (AT); Matthias J. Kasper, Villach (AT)

(73) Assignee: Infineon Technologies Austria AG, Villach (AT)

( * ) Notice: Subject to any disclaimer, the term of this patent is extended or adjusted under 35 U.S.C. 154(b) by 208 days.

(21) Appl. No.: 18/791,577

(22) Filed: Aug. 1, 2024

(65) Prior Publication Data

US 2026/0039223 A1 Feb. 5, 2026

(51) Int. Cl.
*H02M 7/21* (2006.01)
*H02M 7/219* (2006.01)

(52) U.S. Cl.
CPC .................................. *H02M 7/219* (2013.01)

(58) Field of Classification Search
CPC .................................................... H02M 7/219
See application file for complete search history.

(56) References Cited

U.S. PATENT DOCUMENTS 6,353,547 B1 * 3/2002 Jang .................. H02M 3/33571 363/16
11,722,070 B2 * 8/2023 Chen ....................... H02M 7/12 363/45
11,728,725 B2 * 8/2023 Chen ...................... H02M 1/143 363/45
2018/0062537 A1 * 3/2018 Wang .................... H02M 7/487
2019/0058385 A1 * 2/2019 Lazaro .................. H02M 3/158
2021/0194364 A1 * 6/2021 Jung ....................... H02M 3/07
2022/0224231 A1 * 7/2022 Rizzolatti ........... H02M 1/0095
2023/0336078 A1 * 10/2023 Bertolini ................. H02M 3/07
2024/0162831 A1 * 5/2024 Mukherjee .......... H02M 1/0095
2026/0019008 A1 * 1/2026 Rossi .................. H02M 1/0095

* cited by examiner

*Primary Examiner* — Rafael O De Leon Domenech
(74) *Attorney, Agent, or Firm* — Armis IP Law, LLC

(57) ABSTRACT

An apparatus such as a power converter includes: an input interface operative to receive an output voltage generated by a power converter stage; compensation circuitry including switch circuitry and a flying capacitor to derive a compensation current from the output voltage received from the power converter stage; and an output interface operative to supply the compensation current to the power converter stage. Implementation of the compensation circuitry and corresponding generation of the compensation current as discussed herein reduces a respective ripple associated with the output voltage.

20 Claims, 15 Drawing Sheets

POWER CONVERTER WITH BALANCER INCLUDING FLYING CAPACITOR

BACKGROUND

Power converters have long been used to convert a respective input voltage into an output voltage to power a corresponding load. In certain instances, the input voltage is an alternating voltage while the output voltage is a DC voltage. It is typically desirable to produce the respective output voltage to have a low ripple component. Otherwise, corresponding load circuitry powered by the DC voltage may not operate correctly.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure further includes the observation that power conversion efficiency and/or density of conventional power supplies can be improved. For example, to this end, this disclosure includes novel ways of providing improved conversion of a respective input voltage into an output voltage to power a load.

More specifically, this disclosure includes an apparatus (such as power converter or other suitable entity) comprising: an input interface operative to receive an output voltage generated by a power converter stage; compensation circuitry including switch circuitry and a flying capacitor to derive a compensation current from the output voltage received from the power converter stage; and an output interface operative to supply the compensation current to the power converter stage, the compensation current operative to reduce a magnitude of ripple associated with the output voltage.

In one example, the compensation circuitry is configured as a three-level flying capacitor half-bridge circuitry.

In another example, the controller as discussed herein can be configured to control switching operation of the switch circuitry at or around a 50 percent duty cycle.

Yet further, the compensation current as discussed herein is a first current outputted from an output node of the compensation circuitry to the power converter stage. A magnitude of the first current may be substantially equal to a magnitude of second current supplied by the power converter stage to a neutral node of an alternating voltage source. The power converter stage as discussed herein may be configured to convert an alternating voltage outputted from the alternating voltage source into the output voltage received by the compensation circuitry. The substantial equalization of the magnitude of the first current to the magnitude of the second current reduces a magnitude of ripple associated with the output voltage supplied from the power converter stage to the compensation circuitry.

In still further examples as discussed herein, the output voltage received from the power converter stage is operative to power a load. The power converter stage is operative to convert an alternating voltage into the output voltage supplied to the compensation circuitry.

Note further that the input interface as discussed herein may include a first node and a second node operative to receive the output voltage from the power converter stage. The output voltage may be a differential voltage across the first node and the second node. The switch circuitry of the compensation circuitry can be configured to include multiple switches disposed in series between the first node and the second node. The multiple switches may include first switches connected in series with second switches. In one example, the output interface is an output node of the compensation circuitry. The first switches may be connected in series between the first node and an intermediate node of the compensation circuitry; the second switches may be connected in series between the intermediate node of the compensation circuitry and the second node. The first switches may include a first switch and a second switch; the second switches may include a third switch and a fourth switch. Further, the apparatus as discussed herein may include: a third node directly coupling the first switch and the second switch in series between the first node and the intermediate node of the compensation circuitry; and a fourth node directly coupling the third switch and the fourth switch in series between the second node and the intermediate node of the compensation circuitry. The flying capacitor may be connected between the third node and the fourth node.

Further examples as discussed herein may include a controller operative to control the switch circuitry of the compensation circuitry. The controller may control first switches and second switches of the switch circuitry. The first switches and the second switches may be coupled to the flying capacitor to produce the compensation current. The compensation circuitry as discussed herein may further include an inductor to output the compensation current from the output interface to the power converter stage. The control of the first switches and the second switches can be configured to control a magnitude of the compensation current supplied through the inductor of the compensation circuitry to the output interface.

In yet further examples, the first switches as discussed herein may include a first switch and a second switch disposed in a first series circuit path; the second switches as discussed herein may include a third switch and a fourth switch disposed in a second series circuit path. The controller can be configured to switch between activating the first switch and the second switch to alternate between connecting a first node of the flying capacitor to a first node of the compensation circuitry and a second node of the compensation circuitry; the controller can be configured to switch between activating the third switch and the fourth switch to alternate between connecting a second node of the flying capacitor to the second node of the compensation circuitry and a third node of the compensation circuitry.

Still further, note that the flying capacitor as discussed herein may be a first flying capacitor of the compensation circuitry. The switch circuitry may be first switch circuitry of the compensation circuitry. The compensation circuitry as discussed herein can be configured to further include second switch circuitry and a second flying capacitor operative to derive the compensation current from the received output voltage, the second switch circuitry and the second flying capacitor disposed in parallel with the first switch circuitry and the first flying capacitor. In one example, the compensation circuitry further includes a first inductor and a second inductor. The first inductor is coupled to the first switch circuitry and is operative to output a first portion of the compensation current. The second inductor is coupled to the second switch circuitry and is operative to output a second portion of the compensation current.

Still further, the output voltage received by the compensation circuitry is a DC voltage. The power converter stage may be a power factor correction stage operative to produce the DC voltage based on an alternating voltage supplied by a power source to the power factor correction stage.

In accordance with another example as discussed herein, the flying capacitor (such as associated with the voltage balancer) may be a first flying capacitor. The input interface may include a first node and a second node operative to receive the output voltage generated by the power converter stage. The power converter stage can be configured to include: i) a third node connecting first switches and second switches in series between the first node and the second node, ii) a second flying capacitor coupled to the first switches and the second switches, iii) an inductor disposed in series between a power source and the third node.

Further examples as discussed herein include a method comprising: via an input interface, receiving an output voltage from a power converter stage; via compensation circuitry including switch circuitry and a flying capacitor, producing a compensation current from the output voltage received from the power converter stage; and via an output interface, supplying the compensation current to the power converter stage, the compensation current reducing a magnitude of ripple associated with the output voltage.

The compensation current as discussed herein can be generated in any suitable manner. In one example, the method includes: controlling first switches and second switches of the switch circuitry, the first switches and the second switches coupled to the flying capacitor to produce the compensation current.

As previously discussed, the first switches may include a first switch and a second switch disposed in a first series circuit path. The second switches may include a third switch and a fourth switch disposed in a second series circuit path. Further method operations as discussed herein may include: switching between activating the first switch and the second switch to alternate between connecting a first node of the flying capacitor to a first node of the compensation circuitry and a second node of the compensation circuitry; and switching between activating the third switch and the fourth switch to alternate between connecting a second node of the flying capacitor to the second node of the compensation circuitry and a third node of the compensation circuitry.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different techniques as described herein.

Other aspects of the present disclosure include software programs and/or respective hardware to perform any of the operations summarized above and disclosed in detail below.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of techniques herein (BRIEF DESCRIPTION) purposefully does not specify every novel aspect of the present disclosure or claimed invention(s). Instead, this brief description only presents general aspects and corresponding points of novelty over conventional techniques. For additional details and/or possible perspectives (permutations) of the invention(s), the reader is directed to the Detailed Description section (which is a summary) and corresponding figures of the present disclosure as further discussed below.

BRIEF DESCRIPTION OF THE DRAWINGS

FIG. 9 is discussed herein.

The foregoing and other objects, features, and advantages of the disclosed matter herein will be apparent from the following more particular description herein, as illustrated in the accompanying drawings in which like reference characters refer to the same parts throughout the different views.

The drawings are not necessarily to scale, with emphasis instead being placed upon illustrating the principles, concepts, aspects, techniques, etc.

DETAILED DESCRIPTION

Figure 1:
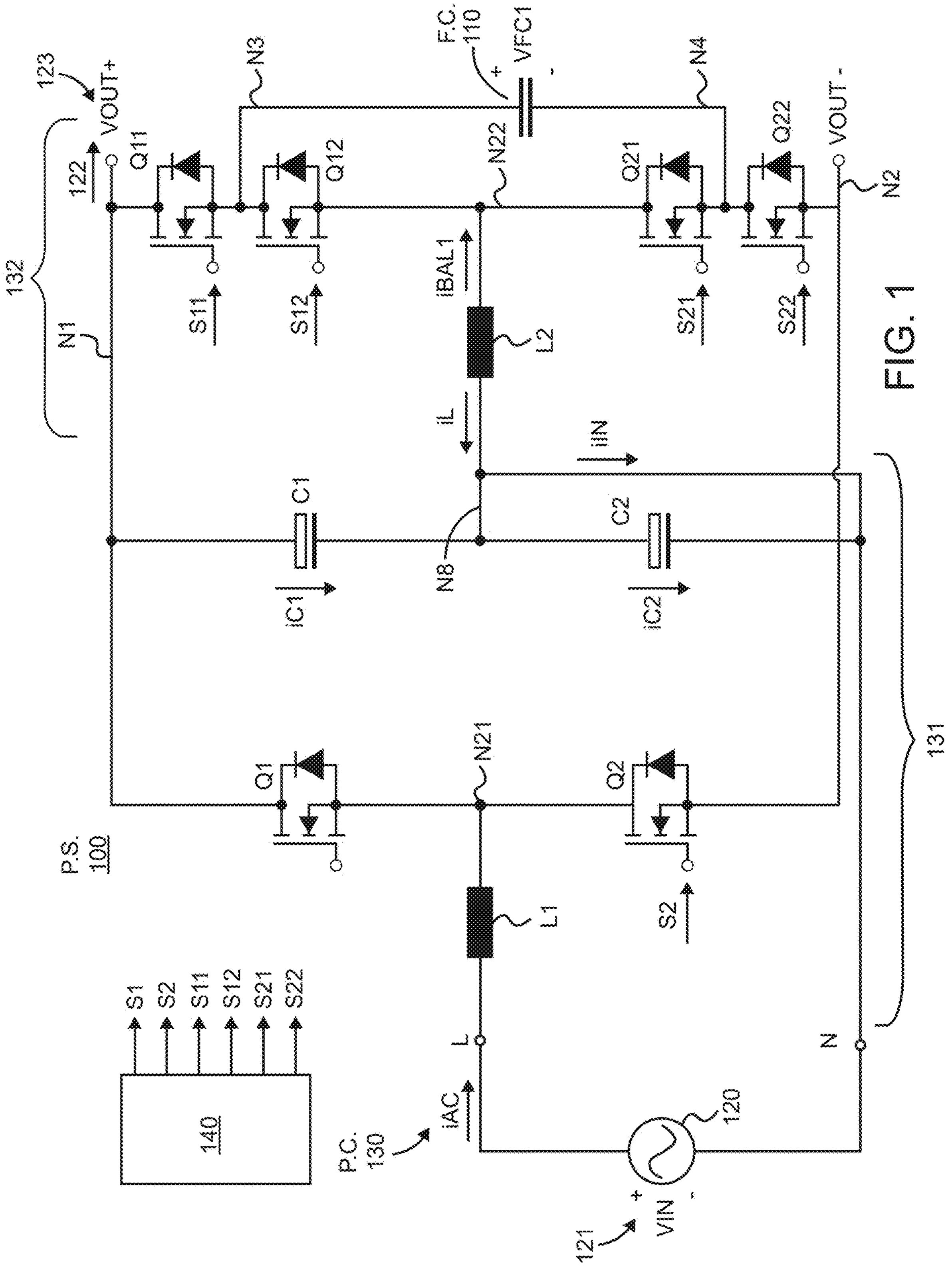
FIG. 1 is an example diagram illustrating a power converter including a respective flying capacitor disposed in compensation circuitry as discussed herein.

The compensation circuitry (also known as a voltage balancer circuit) as discussed herein provides benefits over conventional techniques. For example, the compensation circuitry as discussed herein supports the one or more of following benefits or has the following characteristics:

- Voltage balancer functionality based on 3 level flying capacitor half-bridge topology
- Perfect match of AC current with compensation current at 50% duty cycle
- Enables reduction of switching frequency
- Increase of efficiency over conventional techniques
- Enables operation in open loop when paralleling and interleaving
- Reduces or eliminates need for current sensors
- Provides an easy phase shedding strategy in open loop
- May be used in non-isolated on-board-chargers or any other type of circuit Now, more specifically, FIG. 1 is an example diagram illustrating a novel power converter (such as DC-DC power converter) to convert an input voltage into an output voltage as discussed herein.

As shown in FIG. 1, power supply 100 includes a controller 140 and power converter 130 to receive the input voltage 121 from the voltage source 120. In general, the controller 140 controls the power converter 130 and switching of corresponding circuit paths to convert the received input voltage 121 (a.k.a., Vin) into an output voltage 123 (such as the voltage across node N1 and N2) and corresponding output current 122 (a.k.a., iout) to power a load.

Note that the power converter 130 as shown in FIG. 1 can be configured to include any suitable circuitry to support conversion of the input voltage 121 (such as AC voltage or alternating voltage) into the output voltage 123 (such as a DC voltage and corresponding ripple voltage). For example, as shown in FIG. 1, the power converter 130 as discussed herein can be configured to include the power converter stage 131 and the compensation circuitry 132.

In one example, the power converter stage 131 includes inductor L1, switch Q1, switch Q2, capacitor C1, and capacitor C2.

The power converter stage 131 may be a so-called power factor correction stage operative to produce the output voltage 123 (such as a DC voltage) across the node N1 and node N2 based on an alternating voltage 121 (such as an AC voltage) supplied by the power source 120 to the power factor correction stage.

The switch Q1 and the switch Q2 are connected in series between the node N1 and the node N2. For example, the drain node of switch Q1 is connected to the node N1. The source node of the switch Q1 is connected to the drain node of switch Q2 at node N21. The source node of switch Q2 is connected to the node N2.

The voltage source 120 is connected between the node L (a.k.a., line node receiving a line voltage such as input voltage 121) and the node N (a.k.a., neutral). The inductor L1 is connected between the node L and the node N21.

Still further, the power converter stage 131 includes capacitor C1 and capacitor C2 connected in series between the node N1 and node N2. Node N8 directly couples the combination of capacitor C1, capacitor C2, and inductor L2.

The compensation circuitry 132 includes multiple switches (such as field effect transistors or other suitable switch components) such as switch Q11, switch Q12, switch Q21, and switch Q22.

The combination of the switch Q11 and the switch Q12 is a first series circuit path between the node N1 and the node N22 (such as so-called intermediate node of the compensation circuitry 132). For example, the drain node of switch Q11 is connected to node N1; the source node of switch Q11 is connected to node N3 and the drain node of switch Q12. The source node of switch Q12 is connected to the node N22.

The combination of the switch Q21 and the switch Q22 is a second series circuit path between the node N22 and the node N2. For example, the drain node of switch Q21 is connected to node N22; the source node of switch Q21 is connected to node N4 and the drain node of switch Q22. The source node of the switch Q22 is connected to the node N2.

Yet further, the compensation circuitry 132 includes the inductor L2 connected between node N22 and node N8 (where node N8 is the same as the neutral node N). The flying capacitor 110 is connected between the node N3 and the node N4.

Thus, the compensation circuitry 132 (such as an apparatus or other suitable entity) includes node N3 directly coupling the first switch Q11 and the second switch Q12 in series between the first node N1 and the intermediate node N22 of the compensation circuitry 132.

A fourth node N4 directly couples the third switch Q21 and the fourth switch Q22 in series between the second node N2 and the intermediate node N22 of the compensation circuitry; 132. As previously discussed, the flying capacitor 110 is connected between the third node N3 and the fourth node N4.

As further shown, the controller 140 produces signals S1, S2, S11, S12, S21, and S22, to control operation of the power converter 130.

For example, the controller 140 produces the control signal S1 applied to the gate node of the switch Q1 to control switch Q1; the controller 140 produces the control signal S2 applied to the gate node of the switch Q2 to control switch Q2; the controller 140 produces the control signal S11 applied to the gate node of the switch Q11 to control switch Q11; the controller 140 produces the control signal S12 applied to the gate node of the switch Q12 to control switch Q12; the controller 140 produces the control signal S21 applied to the gate node of the switch Q21 to control switch Q21; the controller 140 produces the control signal S22 applied to the gate node of the switch Q22 to control switch Q22.

Accordingly, the power supply 100 and corresponding power converter 130 as discussed herein includes an input interface (such as node N1 and node N2 or the drain node of switch Q11 and the source node of switch Q22) operative to receive an output voltage (such as Vout or differential voltage Vout+ to Vout− between node N1 and node N2) generated by the power converter stage 131. In such an instance, the compensation circuitry 132 is powered by the output voltage 123 such as Vout between the node N1 and the node N2.

Thus, the power converter 130 further includes the compensation circuitry 132 such as including switch circuitry (such as a combination of switch Q11, Q12, Q21, Q22) and a flying capacitor 110 and inductor L2 to derive a compensation current iL (which is the same as current iBAL1 but negative polarity) from the output voltage 123 received from the power converter stage 131.

As further shown, the compensation circuitry 132 includes an output interface (such as including node N8) operative to supply the compensation current iL through the inductor L2 to the power converter stage 131. As discussed herein, generation of the compensation circuit iL is operative to reduce a magnitude of ripple (such as ripple current or ripple voltage) associated with the output voltage 123 across node N1 and node N2.

In one example, the compensation circuitry 132 is configured as a three-level flying capacitor half-bridge circuitry.

In another example, the compensation current iL is a first current outputted from the inductor L2 to the output node N8 of the compensation circuitry 132. Said differently, current iBAL1 is sunk form node N8. Current iC1 flows from the capacitor C1 from node N1 to node N8. Current iC2 flows from node N8 to node N2.

Note that a magnitude of the compensation current iL (negative iBAL1) may be substantially equal to a magnitude of current (iC1-iC2) supplied by the power converter stage 131 to a neutral node N of the alternating voltage source 120. Accordingly, the power converter stage 131 is operative to convert an alternating voltage 121 outputted from the alternating voltage source 120 into the output voltage Vout (across node N1 and node N2) as received by the compensation circuitry 132. As discussed herein, the substantial equalization of the magnitude of the current iL to the magnitude of the second current (iC1-iC2) is operative to reduce a magnitude of ripple associated with the output voltage 123 supplied from the power converter stage to the compensation circuitry because current iIN is substantially zero.

Compensation circuitry 132 as discussed herein can be configured to significantly reduce current ripple, provide automatic current sharing between parallel balancers legs without additional current sensing, enable implementation of semiconductors (switches) with lower voltage rating (600V instead of 1200V) with better figure of merit.

Figure 2:
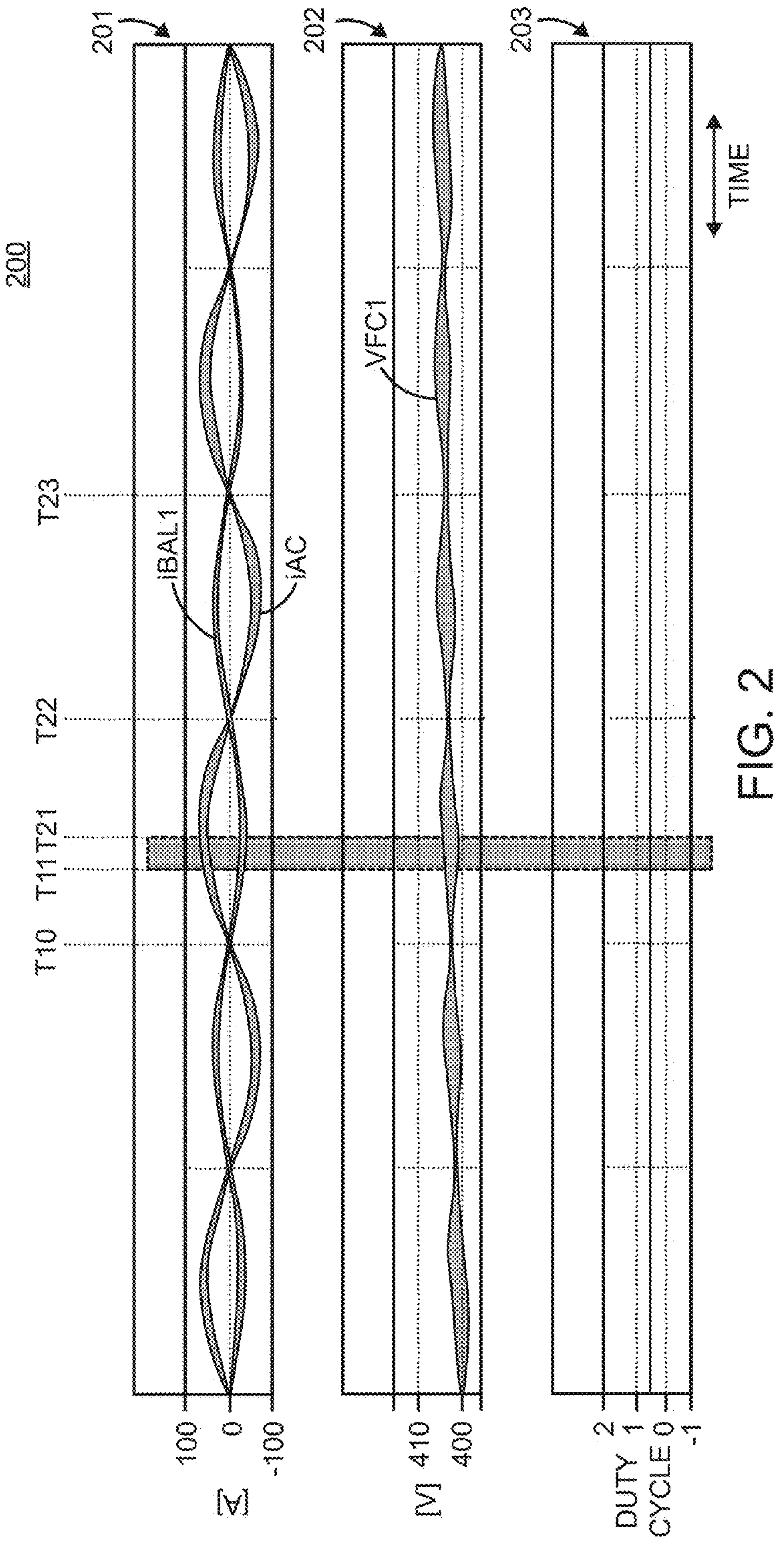
FIG. 2 is an example diagram illustrating current, voltage, and duty cycle, associated with the voltage converter as discussed herein.

FIG. 2 includes example timing diagrams illustrating current, voltage, and duty cycle, associated with the voltage converter as discussed herein.

For example, the timing diagram 201 illustrates variations in the magnitude of iBAL1 (−iL) and magnitude of input current iAC over time.

The timing diagram 202 illustrates variations in a magnitude of the flying capacitor voltage VFC1 stored in the capacitor 110 over time.

The timing diagram 203 indicates that the controller 104 operates the duty cycle of controlling respective switches at a fixed 50 percent duty cycle In this example, between time T10 and time T22, the controller 140 generates the control signal S1 to activate the switch Q1 to an on state; the controller 140 generates the control signal S2 to deactivate the switch Q2 to an off state.

Between time T22 and time T23, the controller 140 generates the control signal S2 to activate the switch Q2 to an on state; the controller generates the control signal S1 to deactivate the switch Q1 to an off state.

In a further example, the frequency associated with the input current iAC and corresponding alternating voltage 121 is 50 hertz or other suitable value. The time period between time T10 and time T23 is one divided by 50 hertz or other suitable value.

Figure 3:
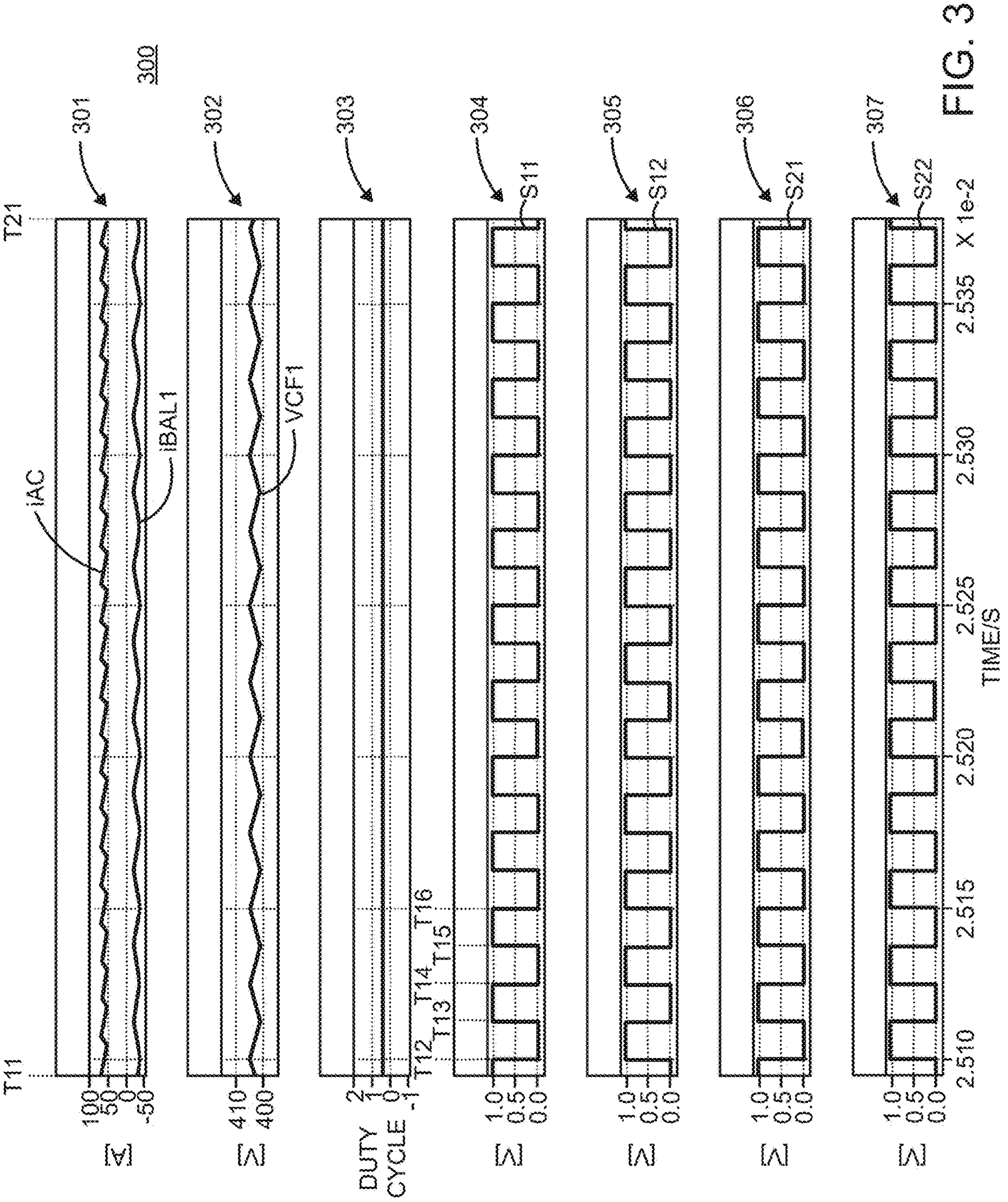
FIG. 3 is an example diagram illustrating control signals, current, voltage, and duty cycle associated with the voltage converter as discussed herein.

More specific details of controlling switches Q11, Q12, Q21, and Q22, and corresponding current and voltages between time T11 time T21 are shown in FIG. 3.

FIG. 3 is an example illustrating multiple timing diagrams of control signals, current, voltage, and duty cycle associated with the voltage converter as discussed herein.

For example, the timing diagram 301 indicates variations in the magnitude of the input current iAC and compensation current iBAL1 between time T11 time T21.

The timing diagram 302 illustrates variations in the magnitude of the flying capacitor voltage VFC1 across the capacitor 110 between time T11 time T21.

The timing diagram 303 indicates that the controller 140 controls the duty cycle of controlling switches at a constant 50 percent duty cycle.

The timing diagram 304 indicates variations in the magnitude of signal S11 between time T11 and time T21. Note that a high level (1) of the control signal S11 controls the respective switch to an on state; a low level (0) of the control signal controls a respective switch to an off state.

The timing diagram 305 indicates variations in the magnitude of signal S12 between time T11 and time T21. Note that a high level (1) of the control signal S12 controls the respective switch to an on state; a low level (0) of the control signal controls a respective switch to an off state.

The timing diagram 306 indicates variations in the magnitude of signal S13 between time T11 and time T21. Note that a high level (1) of the control signal S13 controls the respective switch to an on state; a low level (0) of the control signal controls a respective switch to an off state.

The timing diagram 307 indicates variations in the magnitude of signal S14 between time T11 and time T21. Note that a high level (1) of the control signal S14 controls the respective switch to an on state; a low level (0) of the control signal controls a respective switch to an off state.

In one example, the time period between time T12 and time T14 represents a first control cycle; the time period between time T14 at time T16 represents a second control cycle; and so on.

In a further example, the frequency associated with switching the switches associated with the compensation circuitry 132 is 40 kilohertz or other suitable value. The time period between time T12 and time T14 is one divided by 40 kilohertz other suitable value.

Accordingly, the switching frequency such as 40 kilohertz or other suitable setting associated with switching the switches in the compensation circuitry 132 is much higher than a switching frequency such as 50 hertz or other suitable setting associated with the input voltage 121 generated/provided by the power source 120.

In this example, the controller 140 is operative to switch between activating the switch Q11 and switch Q12 to alternate between connecting the node N3 associated with the flying capacitor 110 to node N1 of the compensation circuitry 132 and node N22 (a.k.a., intermediate node) of the compensation circuitry 132. For example, activation of the switch Q11 to an on state provides a low impedance path between node N1 and node N3. Activation of the switch Q12 provides a low impedance path between the node N3 and the node N22.

The controller 140 is further operative to switch between activating the switch Q21 and the switch Q22 to alternate between connecting a second node N4 of the flying capacitor 110 to the node N22 of the compensation circuitry 132 and node N2 of the compensation circuitry 132. For example, activation of the switch Q22 to an on state provides a low impedance path between node N2 and node N4. Activation of the switch Q21 provides a low impedance path between the node N4 and the node N22.

As a more specific example of switching, between time T12 and time T13, the controller 140 generates the control signal S12 and control signal S22 to activate the switches Q12 and Q22 to ON states. Additionally, between time T12 and time T13, the controller generates the control signal S11 control signal S21 to deactivate switches Q11 and Q21 to OFF states.

Between time T13 and time T14, the controller 140 generates the control signal S12 and control signal S22 to deactivate the switches Q12 and Q22 to OFF states. Additionally, between time T13 and time T14, the controller generates the control signal S11 control signal S21 to activate switches Q11 and Q21 to ON states.

As shown in the timing diagrams in FIG. 3, the pattern of switching repeats itself many times between time T11 and time T21.

As previously discussed, the compensation circuitry 132 includes the inductor L2 to output the compensation current iL (or −iBAL1) to the node N8 (a.k.a., output interface). Via control of the switches Q11, Q12, Q21, and Q22, the controller 140 controls a magnitude of the compensation current iL supplied through the inductor L1 of the compensation circuitry 132 to the output interface (node 8).

Figure 4:
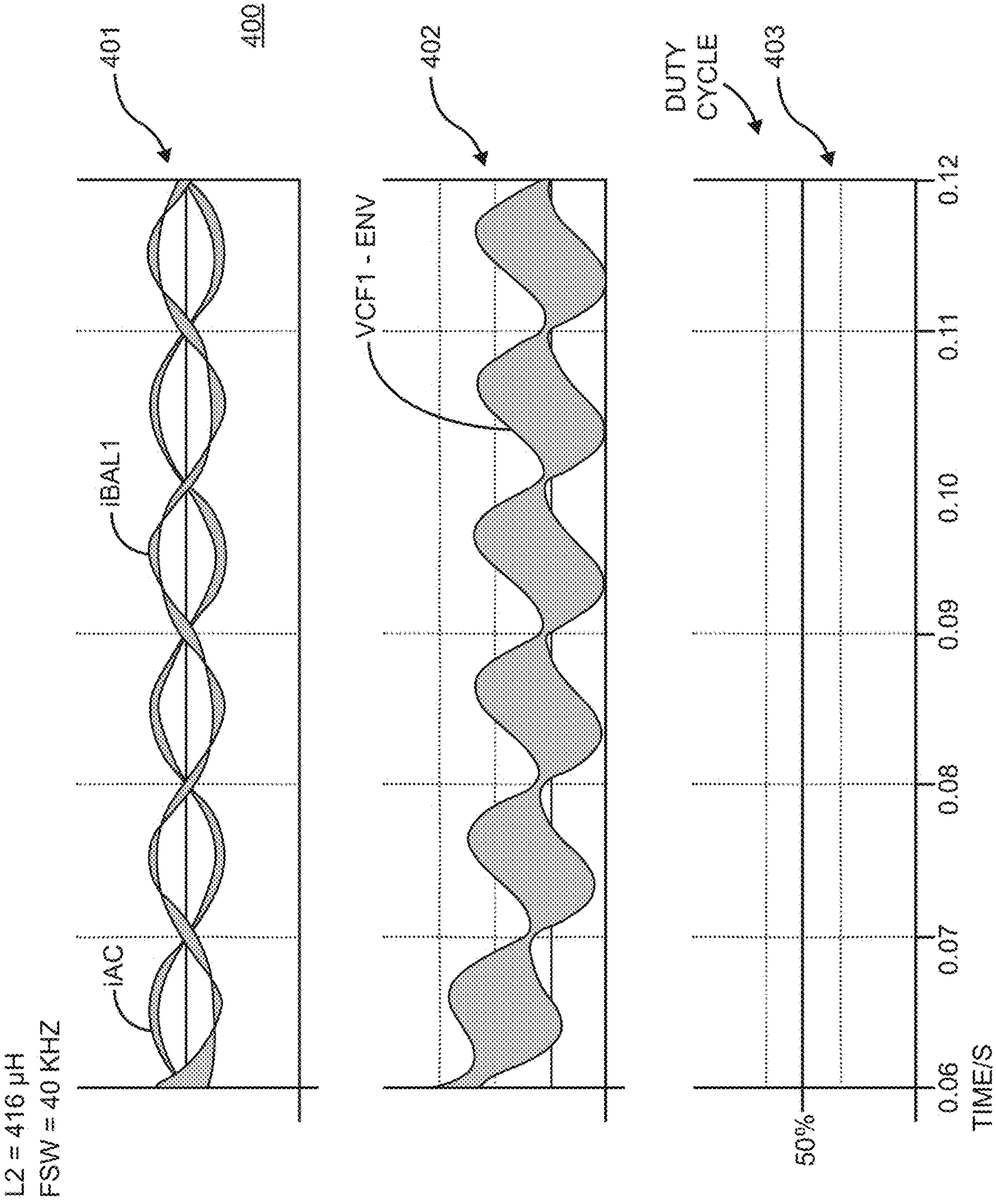
FIG. 4 is an example diagram illustrating current, voltage, and duty cycle, associated with the voltage converter as discussed herein.

FIG. 4 is an example illustrating timing diagrams of current, voltage, and duty cycle, associated with the voltage converter as discussed herein.

In this example, the inductor L2 is set to 416 microhenries. The switching frequency associated with switching of switches in the compensation circuitry 132 is 40 kilohertz. As previously discussed, these particular settings may vary depending upon the example.

Timing diagram 401 illustrates variations in the magnitude of the input current iAC over time. Timing diagram 401 also illustrates variations in the magnitude of the current iBAL1 (negative iL) over time. As shown, the magnitude of the current iBAL1 is approximately equal and opposite the magnitude of the input current iAC.

Timing diagram 402 is an example diagram illustrating an envelope VCF1-ENV associated with the flying capacitor voltage VCF1. In other words, the magnitude of the voltage VCF1 varies within the envelope VCF1-ENV.

Timing diagram 403 indicates that the controller 140 operates at a duty cycle of 50 percent when controlling respective switches in the compensation circuitry 132.

Figure 5:
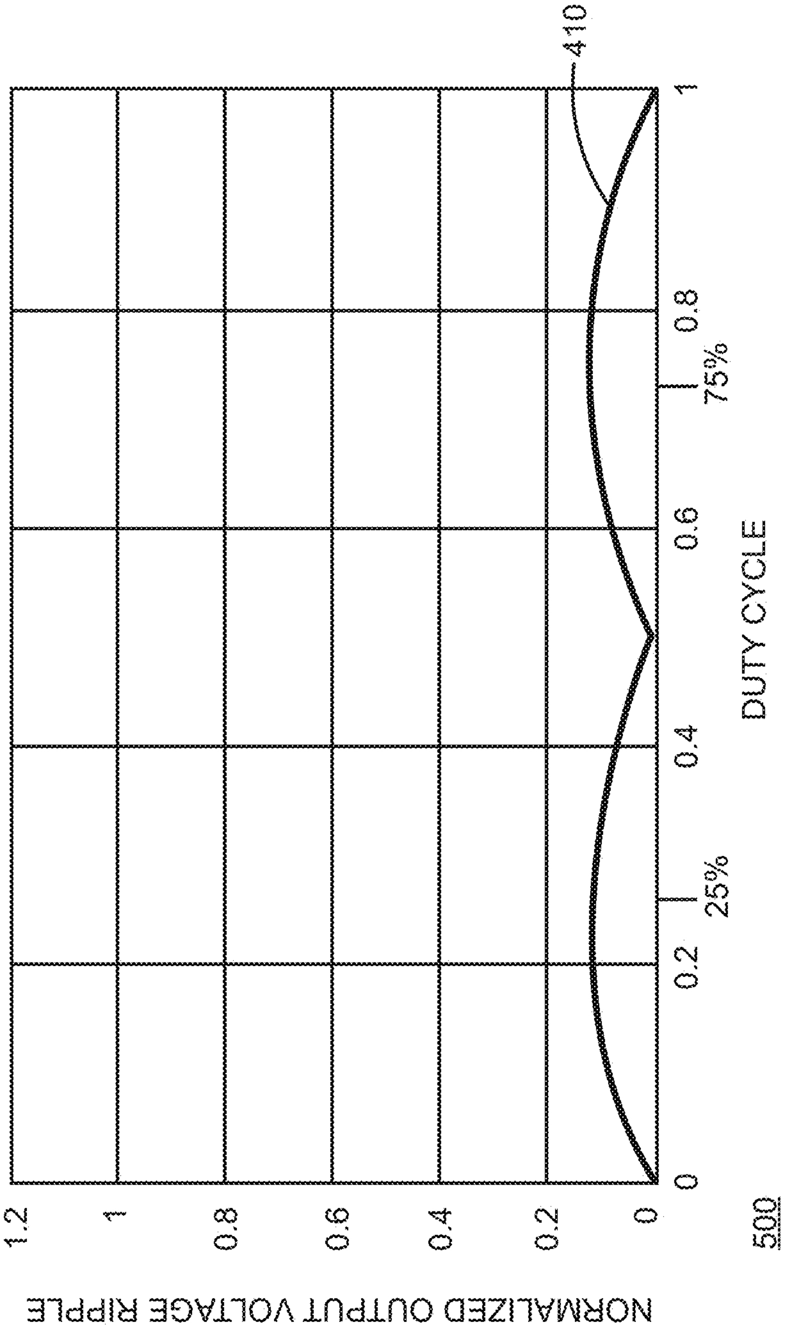
FIG. 5 is an example diagram illustrating a magnitude of ripple on the output voltage versus duty cycle as discussed herein.

FIG. 5 is an example diagram illustrating a magnitude of ripple on the output voltage versus duty cycle as discussed herein.

Graph 500 and corresponding signal 410 indicating normalized output voltage ripple versus duty cycle illustrates that the magnitude of the voltage ripple associated with the output voltage 123 become substantially 0 when operating the switches in the compensation circuitry 132 at around a 50 percent duty cycle.

In other words, via the controller 140, switching operation of the switch circuitry and the compensation circuitry 132 at or around a 50 percent duty cycle (e.g., between 45% and 55% duty cycle or other suitable value) is operative to minimize a magnitude of ripple voltage associated with generating the output voltage 123 within a duty cycle range between a 25 percent duty cycle and a 75 percent duty cycle.

Figure 6:
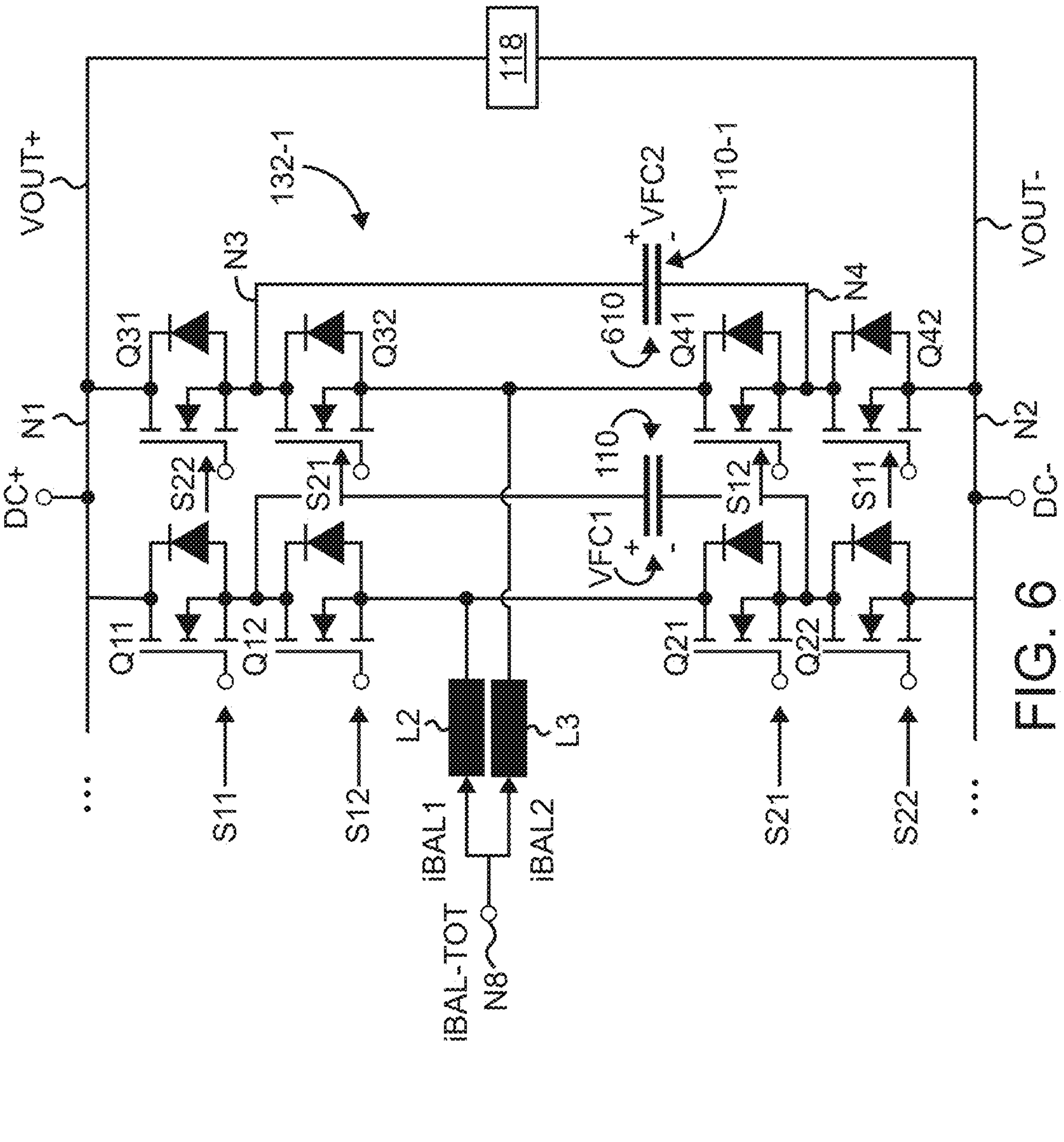
FIG. 6 is an example diagram illustrating compensation circuitry including multiple parallel circuit paths as discussed herein.

FIG. 6 is an example diagram illustrating compensation circuitry including multiple parallel circuit paths as discussed herein.

In this example, the output voltage Vout (123) powers the load 118. The compensation circuitry 132 is replaced with the compensation circuitry 132-1. The compensation circuitry 132-1 includes multiple instances of the compensation circuitry 132 of FIG. 1 in parallel.

For example, as shown in FIG. 6, the compensation circuitry 132-1 includes the original compensation circuitry 132 (powered by Vout) as well as a duplicate of the compensation circuitry 132 (powered by Vout) such as additional components including switch Q31, switch Q32, switch Q41, switch Q42, flying capacitor 110-1, and inductor L3.

The combination of switch Q11, switch Q12, switch Q21, switch Q22, flying capacitor 110, and inductor L2 is disposed in parallel with the combination of switch Q31, switch Q32, switch Q41, switch Q42, flying capacitor 110-1, and inductor L3. The parallel combination of these instances of the compensation circuitry provide a higher magnitude of balance current.

As shown in this example, the total current sunk from the node N8 is iBAL-TOT such as iBAL1+iBAL2. The magnitude of current iBAL2 through the inductor L3 is controlled via operation of the respective switches Q31, Q32, Q41, and Q42. In such an instance, the inductor L2 coupled to the switch circuitry (Q11, Q12, Q21, Q22) is operative to output a first portion (iBAL1) of the total compensation current iBAL-TOT; the inductor L2 coupled to the switch circuitry (Q31, Q32, Q41, Q42) is operative to output a second portion (iBAL2) of the total compensation current iBAL-TOT.

Figure 7:
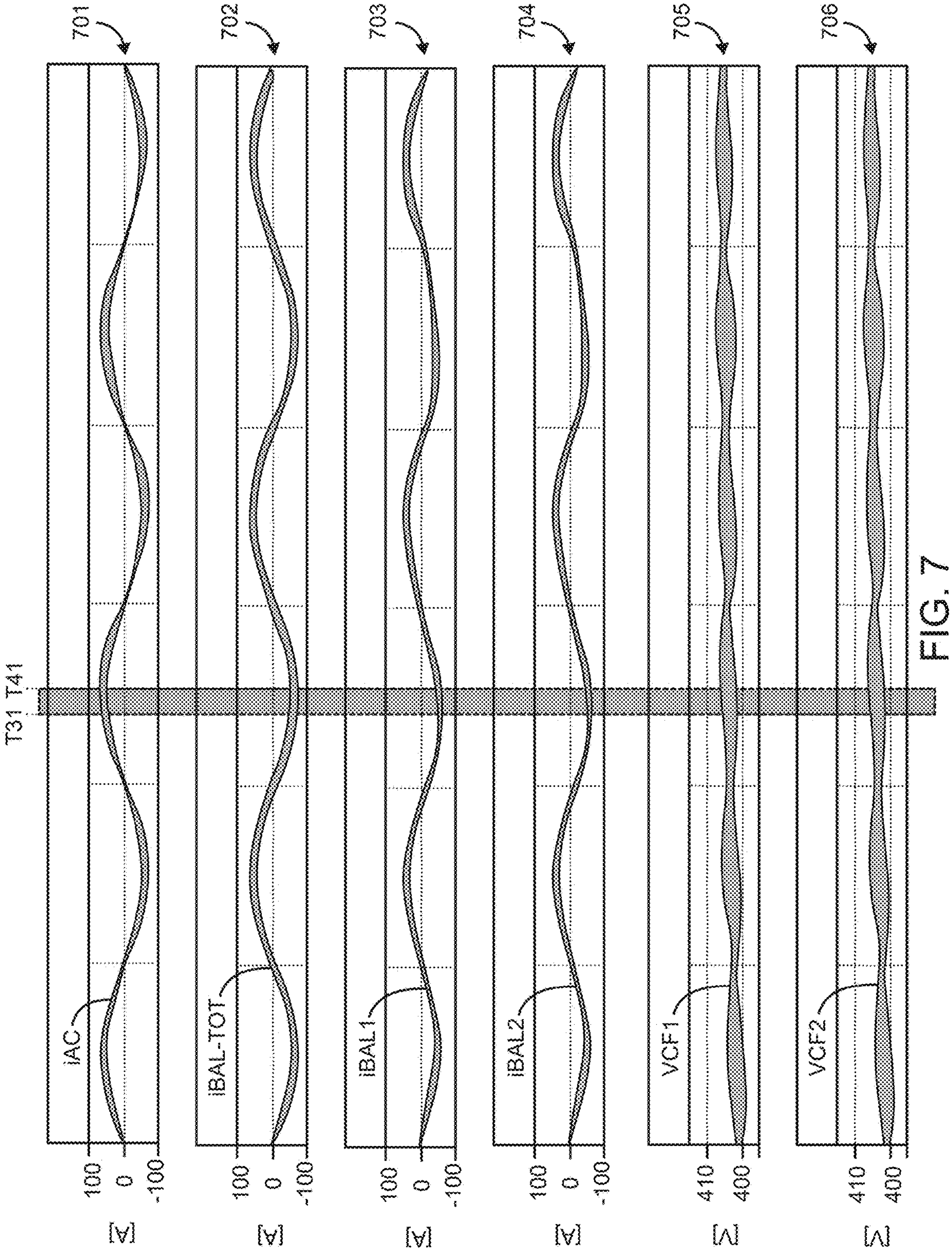
FIG. 7 is an example illustrating timing diagrams of current, voltage, and duty cycle, associated with the voltage converter as discussed herein.

FIG. 7 is an example diagram illustrating current, voltage, and duty cycle, associated with the voltage converter over time as discussed herein.

For example, the timing diagram 701 illustrates a magnitude of the current iAC being substantially equal to the magnitude of the current iBAL-TOT (timing diagram 702), where iBAL-TOT is equal to iBAL1+iBAL2 as previously discussed. iBAL1 is shown in timing diagram 703; iBAL2 is shown in timing diagram 704.

Timing diagram 705 and timing diagram 706 further illustrate magnitudes of the flying capacitor voltages VCF1 and VCF2 over time.

Figure 8:
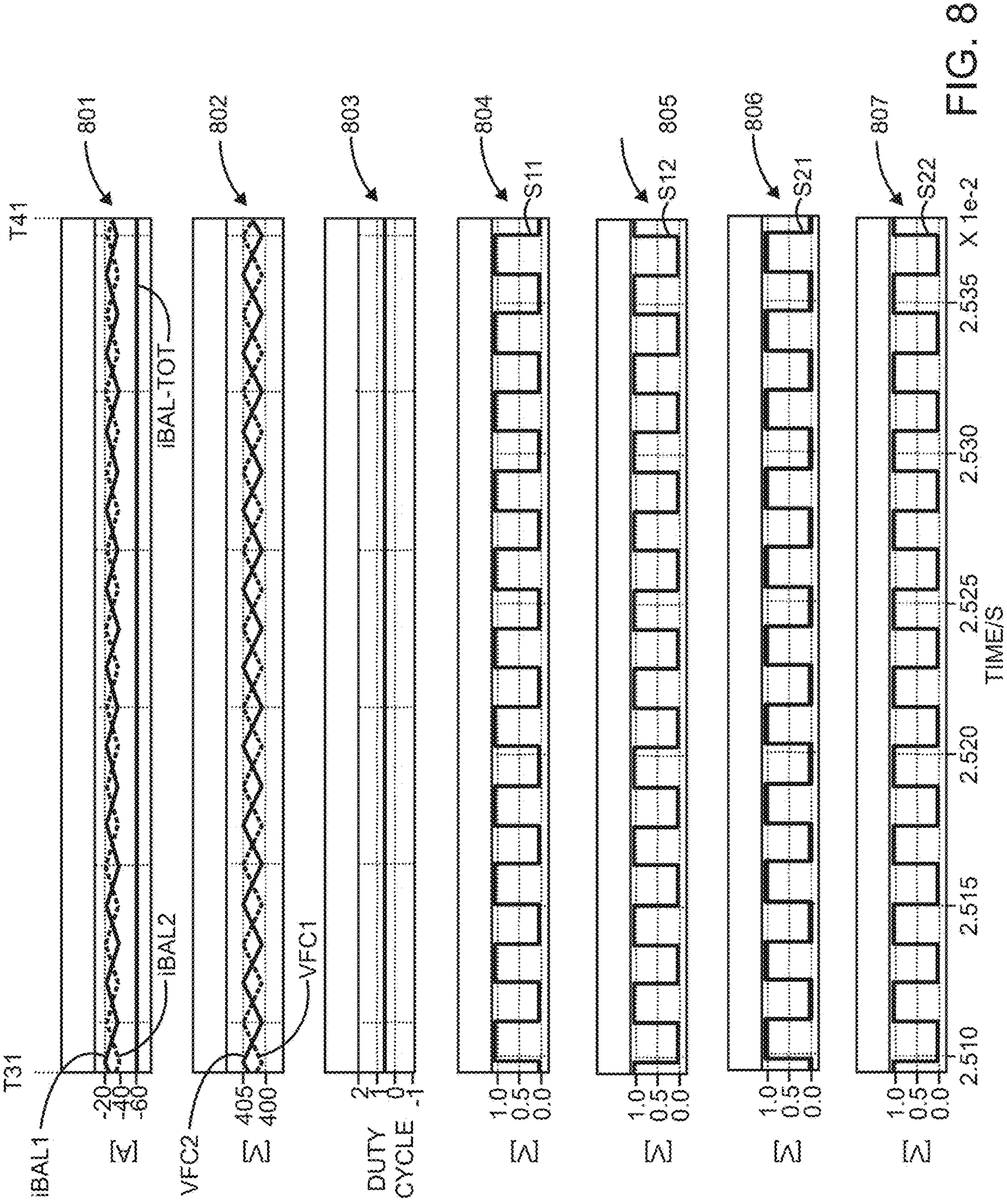
FIG. 8 is an example diagram illustrating control signals, current, voltage, and duty cycle associated with the voltage converter as discussed herein.

FIG. 8 is an example diagram illustrating control signals, current, voltage, and duty cycle associated with the voltage converter and corresponding compensation circuitry as discussed herein.

For example, the timing diagram 801 indicates variations in the magnitude of the compensation current iBAL-TOT between time T31 time T41.

The timing diagram 802 illustrates variations in the magnitude of the flying capacitor voltage VFC1 across the capacitor 110 between time T31 time T41. The timing diagram 802 also illustrates variations in the magnitude of the flying capacitor voltage VFC2 across the capacitor 610 between time T31 time T41.

The timing diagram 803 indicates that the controller 140 controls the duty cycle of controlling switches at a constant 50 percent duty cycle.

The timing diagram 804 indicates variations in the magnitude of signal S11 between time T31 and time T41. Note that a high level (1) of the control signal S11 controls the respective switch to an on state; a low level (0) of the control signal controls a respective switch to an off state.

The timing diagram 805 indicates variations in the magnitude of signal S12 between time T31 and time T41. Note that a high level (1) of the control signal S12 controls the respective switch to an on state; a low level (0) of the control signal controls a respective switch to an off state.

The timing diagram 806 indicates variations in the magnitude of signal S21 between time T31 and time T41. Note that a high level (1) of the control signal S21 controls the respective switch to an on state; a low level (0) of the control signal controls a respective switch to an off state.

The timing diagram 807 indicates variations in the magnitude of signal S22 between time T31 and time T41. Note that a high level (1) of the control signal S22 controls the respective switch to an on state; a low level (0) of the control signal controls a respective switch to an off state.

Figure 9:
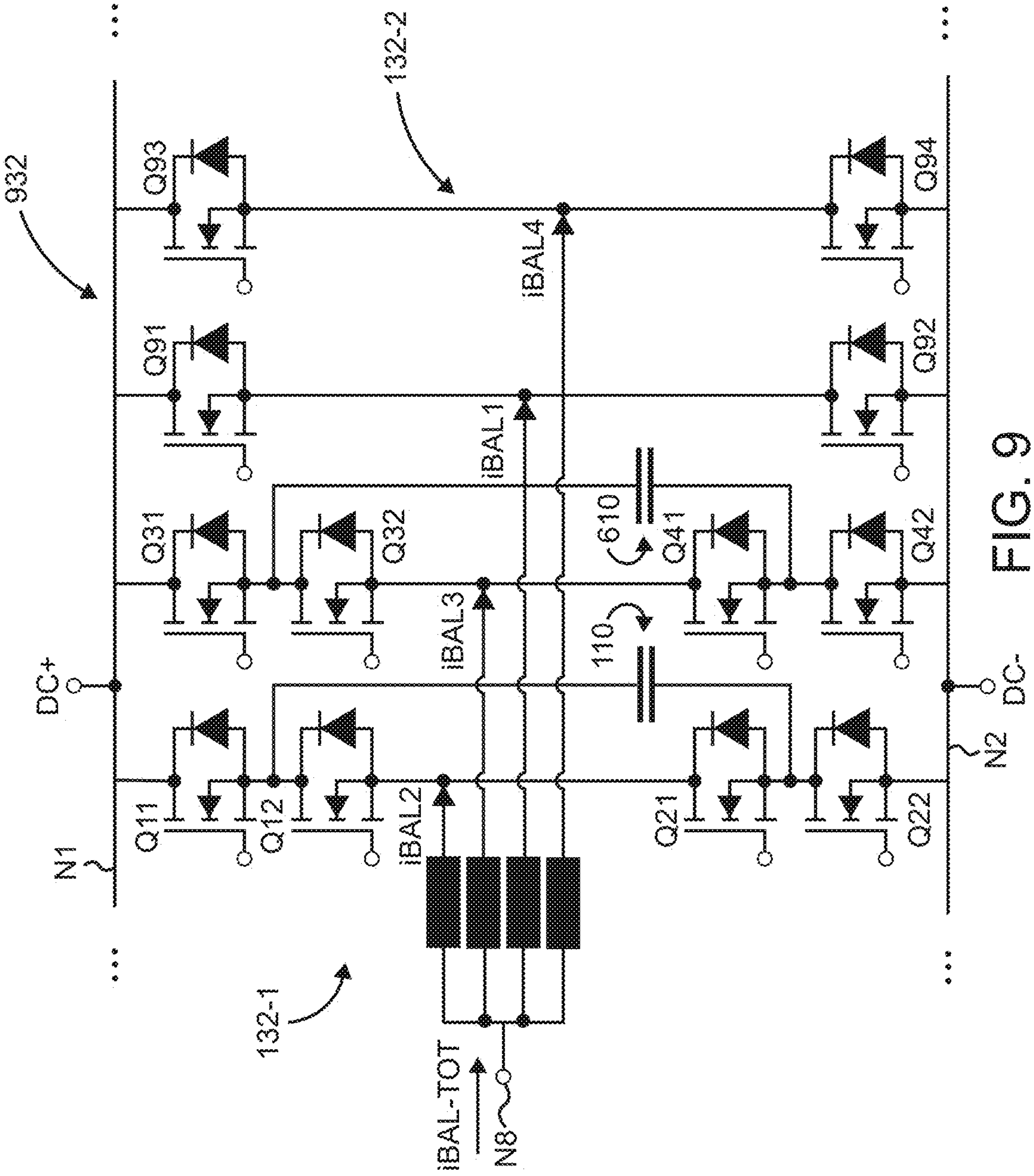
FIG. 9 is an example diagram illustrating a parallel combination of different types of compensation circuitry as discussed herein.

FIG. 9 is an example diagram illustrating a parallel combination of different types of compensation circuitry as discussed herein.

This implementation of the compensation circuitry 932 includes a parallel combination of the 3 level compensation circuitry 132-1 in FIG. 6 as well as the 2 level compensation circuitry 132-2 (such as more conventional voltage balance circuitry). In a similar manner as previously discussed, the controller 140 can be configured to drive respective switches in each of the portions of compensation circuitry to produce respective compensation current. In this example, the compensation current iBAL-TOT is a summation of current iBAL1, current IBAL2, current iBAL3, and current iBAL4.

Figure 10:
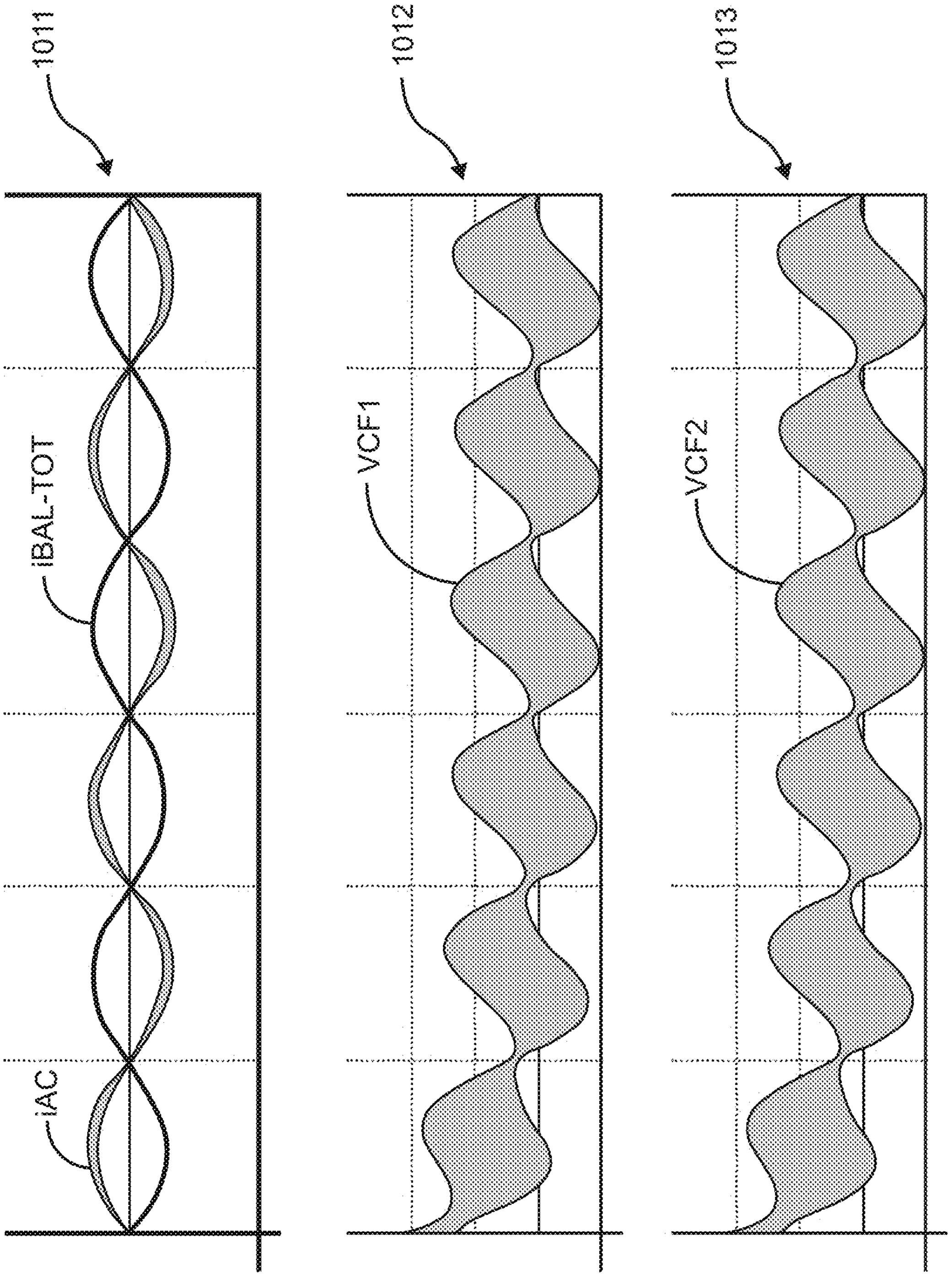
FIG. 10 is an example diagram illustrating current, flying capacitor voltage, and duty cycle of operating the compensation circuitry

FIG. 10 is an example diagram illustrating current, flying capacitor voltage, and duty cycle of operating the compensation circuitry and FIG. 9 is discussed herein.

In this example, the 2 level compensation circuitry 132-2 is deactivated and the 3 level compensation circuitry is activated. Timing diagram 1011 illustrates generation of the total compensation current iBAL-TOT as being substantially equal to the input current iAC.

Timing diagram 1012 illustrates the respective the flying capacitor voltage VCF1. Timing diagram 1013 illustrates the respective voltages flying capacitor VCF2.

Figure 11:
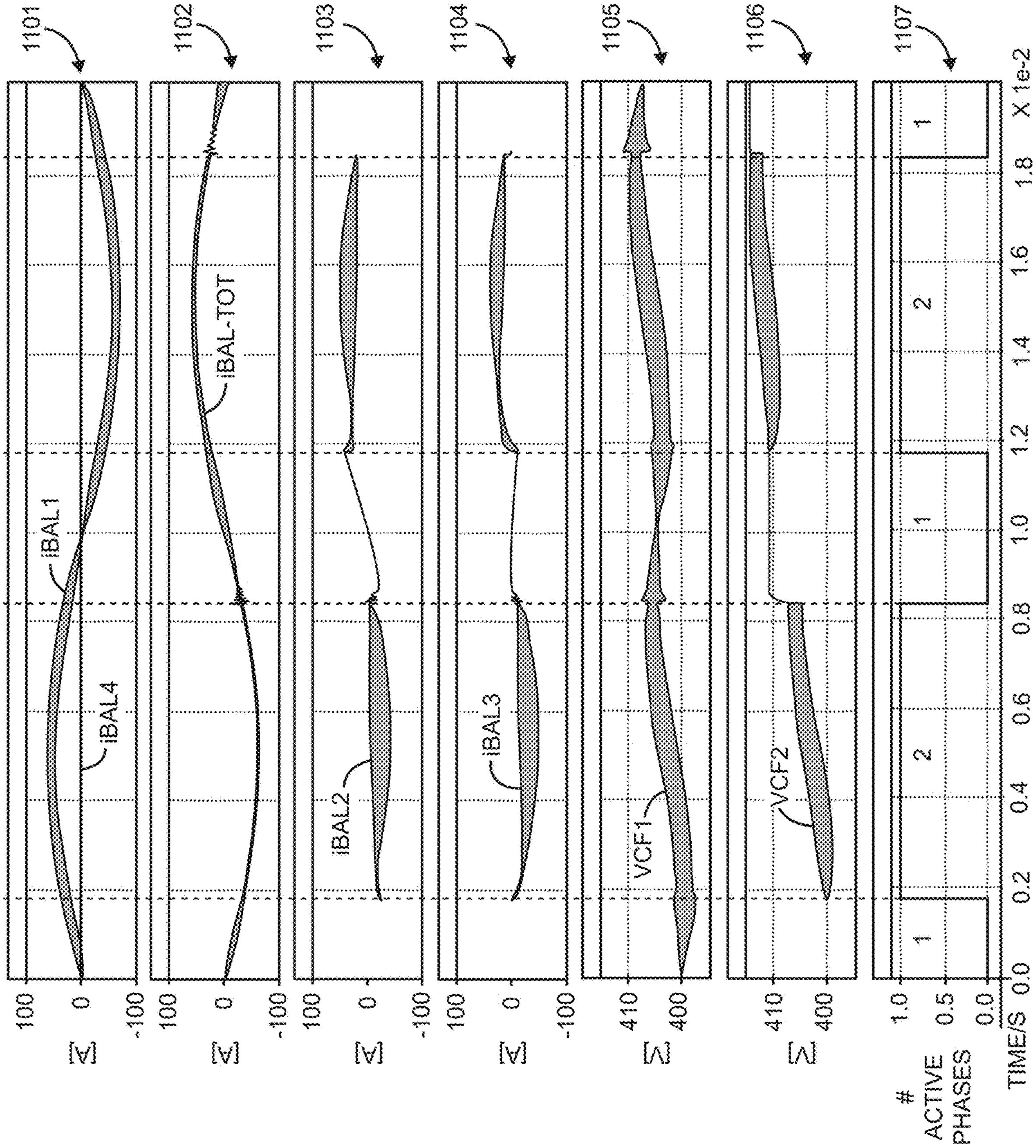
FIG. 11 is an example timing diagram illustrating phase shedding as discussed herein.

FIG. 11 is an example illustrating timing diagrams (1101, 1102, 1103, 1104, 1105 1106, and 1107) associated with phase shedding as discussed herein.

In this example, the controller 140 implements a phase shedding strategy to improve the overall performance of the compensation circuitry (a.k.a., voltage balancer).

For example, one example herein includes defining a current threshold associated with the dual compensation circuitry. During conditions when the current iAC is above the threshold, the controller 140 activates both phases of the dual phase compensation circuitry. Conversely, below the threshold, the controller 140 operates one phase of the compensation circuitry or the other because high current is not needed.

In a further example, although the controller operates the compensation circuitry and open loop mode (fixed duty cycle at 50%), the controller 140 can be configured to transition between activation of one phase or two phases.

Distortion of the balancer current iBAL may have no impact on the AC input current iAC.

Figure 12:
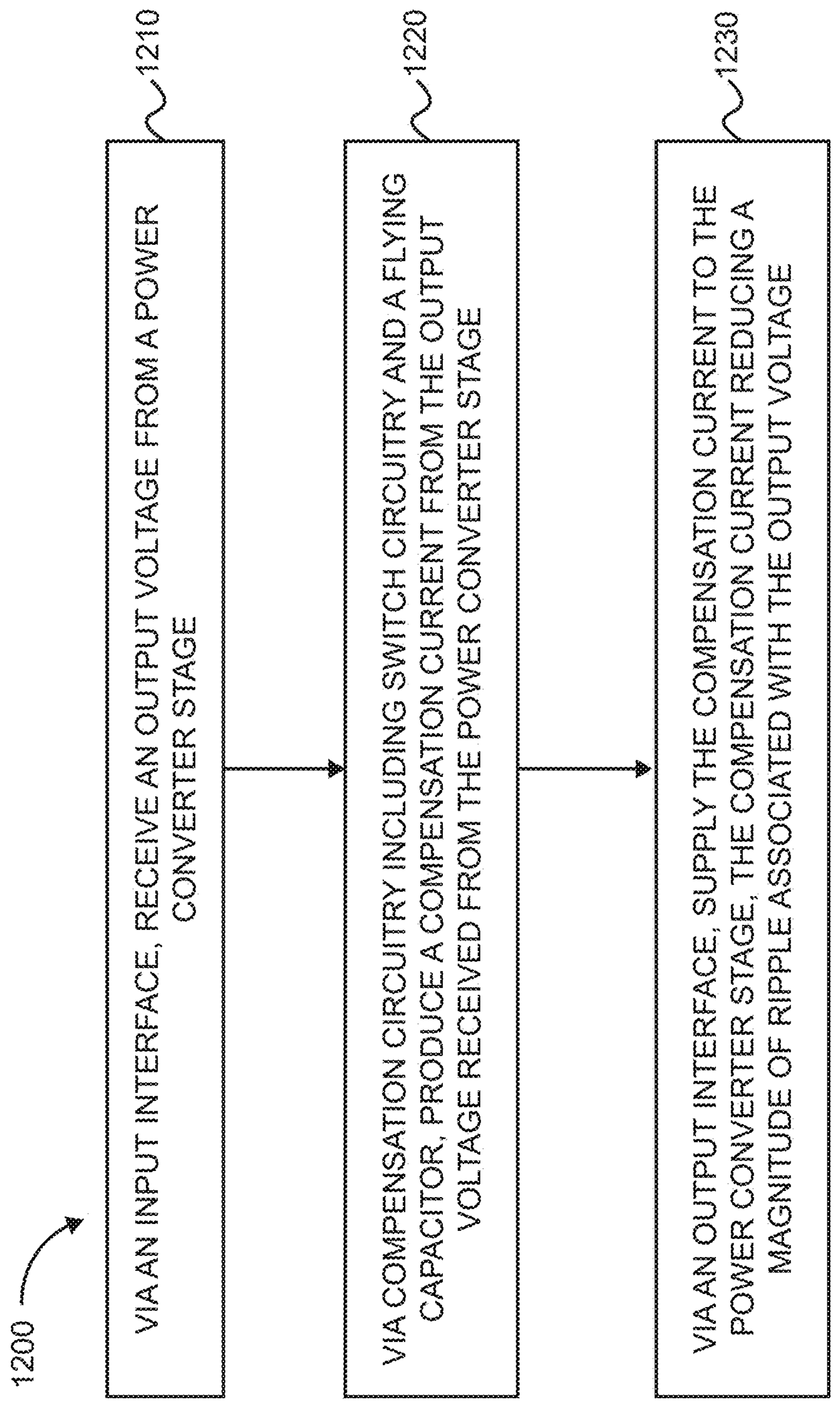
FIG. 12 is an example method of operating compensation circuitry as discussed herein.

FIG. 12 is an example method (such as flowchart 1200) of operating compensation circuitry as discussed herein.

In processing operation 1210, via the input interface such as node N1 and N2, the compensation circuitry 132 receives an output voltage 123 generated by the power converter stage 131.

In processing operation 1220, the compensation circuitry including switch circuitry and one or more flying capacitors operative to produce a total compensation current from the output voltage received from the power converter stage.

In processing operation 1230, via an output interface such as node N8, the compensation circuitry supplies the compensation current to the power converter stage 131. As previously discussed, the compensation current reduces a magnitude of ripple associated with the output voltage.

Figure 13:
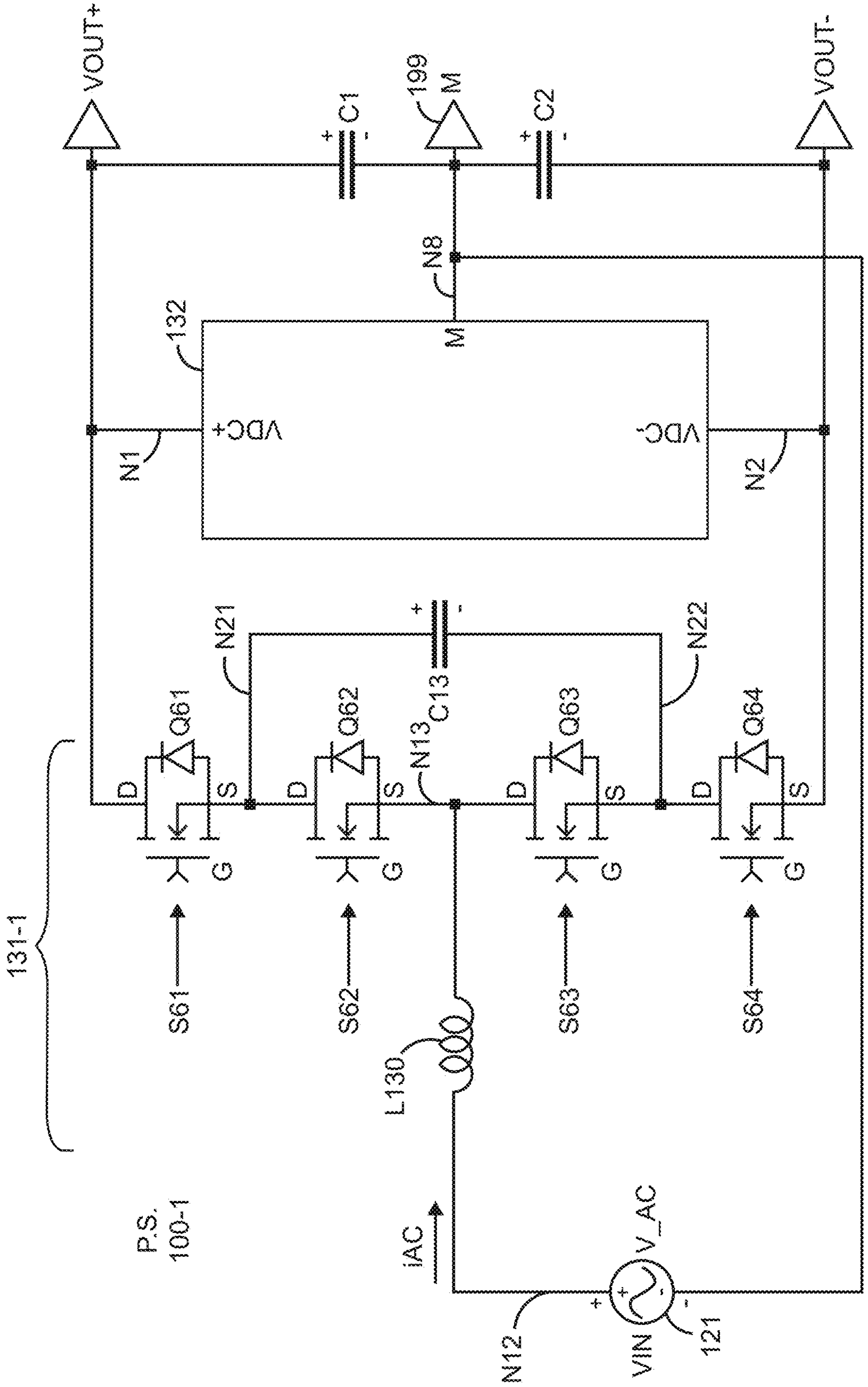
FIG. 13 is an example diagram illustrating another implementation of a power converter circuit as discussed herein.

FIG. 13 is an example diagram illustrating another implementation of a power converter circuit as discussed herein.

In this example, the power supply 100-1 (a.k.a., power converter) includes power source 121, power converter stage 131-1, and the compensation circuitry 132 (a.k.a., voltage balancer).

As shown, the power converter stage 131-1 includes inductor L130, multiple switches Q61, Q62, Q63, and Q64, and flying capacitor C13.

The multiple switches are connected in series between the node N1 and node N2. For example, the drain node of switch Q61 is connected to node N1; the source node of switch Q61 is connected to and the drain node of switch Q62 at node N21. The source node of the switch Q62 is connected to the drain node of switch Q63 at node N13; the source node of switch Q63 is connected to the drain node of switch Q64 at node N22. The source node of switch Q64 is connected to node N2.

The flying capacitor C13 is connected between node N21 and node N22.

The inductor L130 is connected between the node N12 and the node N13.

Node N8 is connected to the ground reference 199.

Controller 140 produces the control signal S61 applied to the gate node of switch Q61 to control switch Q61; controller 140 produces the control signal S62 applied to the gate node of switch Q62 to control switch Q62; controller 140 produces the control signal S63 applied to the gate node of switch Q63 to control switch Q63; controller 140 produces the control signal S64 applied to the gate node of switch Q64 to control switch Q64.

Figure 14:
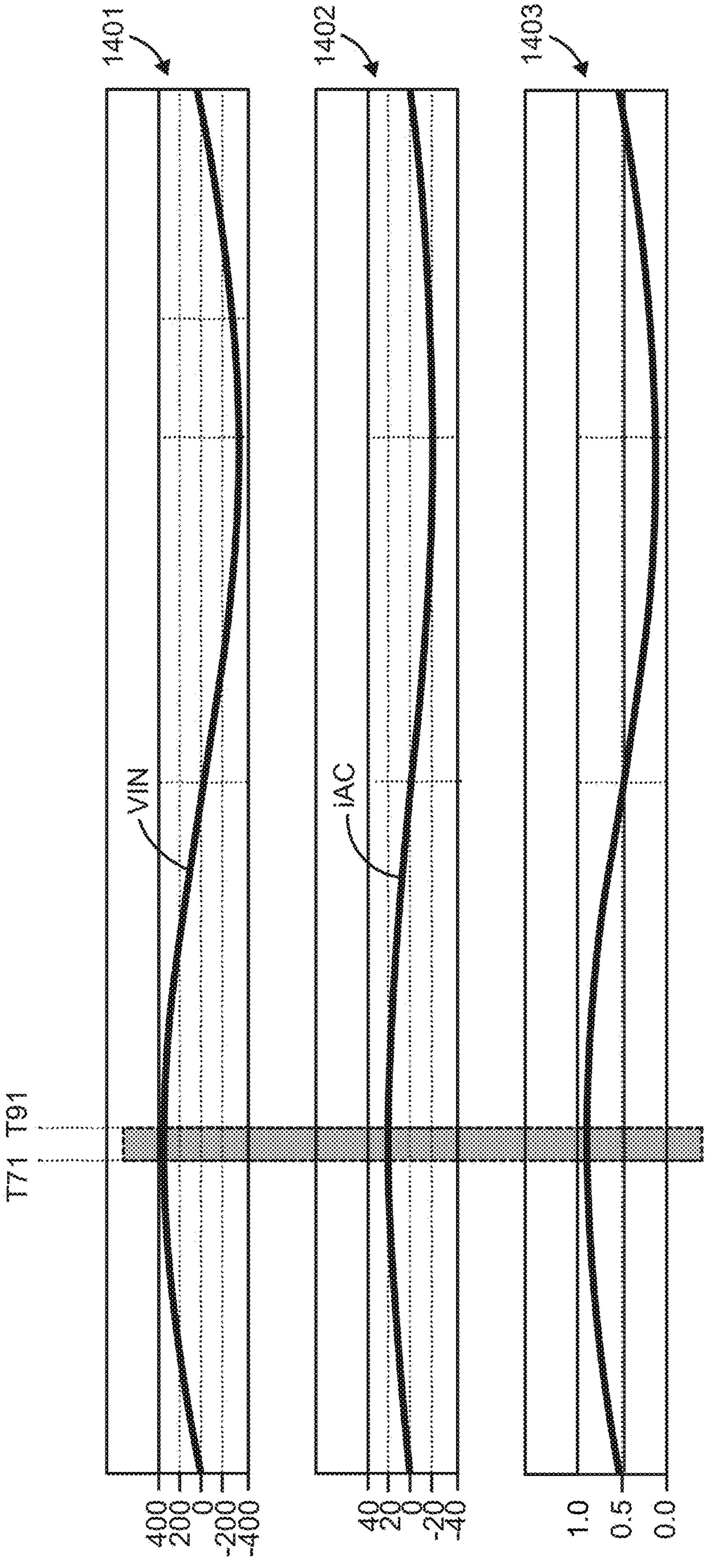
FIG. 14 is an example diagram illustrating signals associated with operating the power converter circuit as in FIG. 13.
Figure 15:
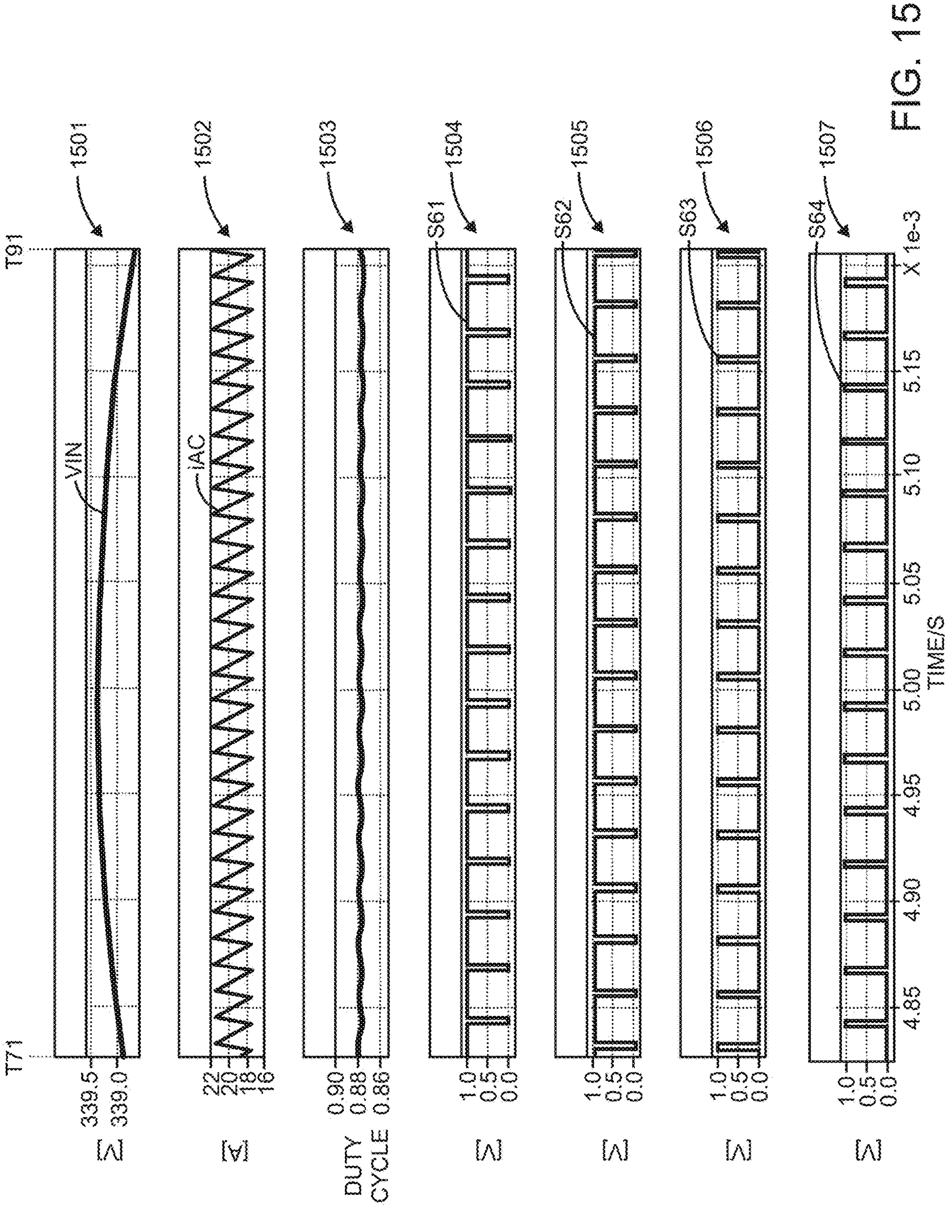
FIG. 15 is an example diagram illustrating signals associated with operating a power converter circuit is in FIG. 13.

Operation of the power supply 100-1 is further shown in FIGS. 14 and 15.

FIG. 14 is an example diagram illustrating signals associated with operating the power converter circuit as in FIG. 13.

Timing diagram 1401 indicates variations in the magnitude of the input voltage Vin supplied by the power source 121 over time.

Timing diagram 1402 indicates variations in the magnitude of the input current iAC over time.

Timing diagram 1403 indicates variations in the duty cycle provided by the controller 140 and controlling respective switches Q61, Q62, Q63, and Q64.

FIG. 15 is an example diagram illustrating signals associated with operating a power converter circuit is in FIG. 13.

In this example, the timing diagrams in FIG. 15 illustrate more particular details associated with signals between time T71 and time T91.

For example, the timing diagram 1501 illustrates a variation in the magnitude of the input voltage Vin over time between time T71 and time T91.

Timing diagram 1502 illustrates variations in the magnitude of the input current iAC over time between time T71 and time T91.

Timing diagram 1503 illustrates a setting of the duty cycle (associated with controlling switches Q61, Q62, Q63, and Q64) over time between time T71 and time T91.

Timing diagram 1504 illustrates variations in the magnitude of the control signal S61 applied to the switch Q61 between time T71 and time T91.

Timing diagram 1505 illustrates variations in the magnitude of the control signal S62 applied to the switch Q62 between time T71 and time T91.

Timing diagram 1506 illustrates variations in the magnitude of the control signal S63 applied to the switch Q63 between time T71 and time T91.

Timing diagram 1507 illustrates variations in the magnitude of the control signal S64 applied to the switch Q64 between time T71 and time T91.

Control of the respective switches in a manner shown in FIG. 15 results in conversion of the input voltage Vin into the output voltage 123. Thus, as previously discussed, the input interface (such as node N1 and node N2) receives the output voltage 123 generated by the power converter stage 131-1. The power converter stage 131-1 can be configured to include: i) a node N13 connecting first switches (switch Q61 and Q62) and second switches (switch Q63 and switch Q64) in series between the node N1 and node N2, ii) a second flying capacitor C13 coupled to the first switches and the second switches between node N21 and node N22, iii) an inductor L130 disposed in series between a power source 121 and node N8. Switching operation of the switches in the power converter stage 131-1 converts the input voltage Vin and corresponding input current iAC received from the input voltage source 121 into the output voltage 123.

Note again that techniques herein are well suited for use in power converter applications. However, it should be noted that the disclosure of matter herein is not limited to use in such applications and that the techniques discussed herein are well suited for other applications as well.

While this invention has been particularly shown and described with references to preferred aspects thereof, it will be understood by those skilled in the art that various changes in form and details may be made therein without departing from the spirit and scope of the present application as defined by the appended claims. Such variations are intended to be covered by the scope of this present application. As such, the foregoing description in the present disclosure is not intended to be limiting. Rather, any limitations to the invention are presented in the following claims.

The invention claimed is:

1. An apparatus comprising:

an input interface operative to receive an output voltage generated by a power converter stage;

compensation circuitry including switch circuitry and a flying capacitor to derive a compensation current from the output voltage received from the power converter stage; and an output interface operative to supply the compensation current to the power converter stage, the compensation current operative to reduce a magnitude of ripple associated with the output voltage.

2. The apparatus as in claim 1, wherein the compensation circuitry is configured as a three-level flying capacitor half-bridge circuitry.

3. The apparatus as in claim 1, wherein switching operation of the switch circuitry at or around a 50 percent duty cycle is operative to minimize a magnitude of ripple voltage associated with the output voltage.

4. The apparatus as in claim 1, wherein the compensation current is a first current outputted from an output node of the compensation circuitry to the power converter stage; and wherein a magnitude of the first current is substantially equal to a magnitude of second current supplied by the power converter stage to a neutral node of an alternating voltage source, the power converter stage operative to convert an alternating voltage outputted from the alternating voltage source into the output voltage received by the compensation circuitry.

5. The apparatus as in claim 4, wherein the substantial equalization of the magnitude of the first current to the magnitude of the second current is operative to reduce a magnitude of ripple associated with the output voltage supplied from the power converter stage to the compensation circuitry.

6. The apparatus as in claim 1, wherein the output voltage received from the power converter stage is operative to power a load; and wherein the power converter stage is operative to convert an alternating voltage into the output voltage supplied to the compensation circuitry.

7. The apparatus as in claim 1, wherein the input interface includes a first node and a second node operative to receive the output voltage from the power converter stage, the output voltage being a differential voltage across the first node and the second node; and wherein the switch circuitry includes multiple switches disposed in series between the first node and the second node, the multiple switches including first switches connected in series with second switches.

8. The apparatus as in claim 7, wherein the output interface includes an output node of the compensation circuitry;

wherein the first switches are connected in series between the first node and an intermediate node of the compensation circuitry; and wherein the second switches are connected in series between the intermediate node of the compensation circuitry and the second node.

9. The apparatus as in claim 8, wherein the first switches include a first switch and a second switch; and when the second switches include a third switch and a fourth switch.

10. The apparatus as in claim 9 further comprising:

a third node directly coupling the first switch and the second switch in series between the first node and the intermediate node of the compensation circuitry;

a fourth node directly coupling the third switch and the fourth switch in series between the second node and the intermediate node of the compensation circuitry; and wherein the flying capacitor is connected between the third node and the fourth node.

11. A controller operative to control the switch circuitry in claim 1, the controller operative to control first switches and second switches of the switch circuitry, the first switches and the second switches coupled to the flying capacitor to produce the compensation current.

12. The controller as in claim 11, wherein the compensation circuitry further includes an inductor to output the compensation current from the output interface to the power converter stage; and wherein the control of the first switches and the second switches controls a magnitude of the compensation current supplied through the inductor of the compensation circuitry to the output interface.

13. The controller as in claim 11, wherein the first switches include a first switch and a second switch disposed in a first series circuit path;

wherein the second switches include a third switch and a fourth switch disposed in a second series circuit path;

wherein the controller is operative to switch between activating the first switch and the second switch to alternate between connecting a first node of the flying capacitor to a first node of the compensation circuitry and a second node of the compensation circuitry; and wherein the controller is operative to switch between activating the third switch and the fourth switch to alternate between connecting a second node of the flying capacitor to the second node of the compensation circuitry and a third node of the compensation circuitry.

14. The apparatus as in claim 1, wherein the flying capacitor is a first flying capacitor;

wherein the switch circuitry is first switch circuitry, the apparatus further comprising:

second switch circuitry and a second flying capacitor operative to derive the compensation current from the received output voltage, the second switch circuitry and the second flying capacitor disposed in parallel with the first switch circuitry and the first flying capacitor.

15. The apparatus as in claim 14 further comprising:

a first inductor coupled to the first switch circuitry, the first inductor operative to output a first portion of the compensation current; and a second inductor coupled to the second switch circuitry, the second inductor operative to output a second portion of the compensation current.

16. The apparatus as in claim 15, wherein the received output voltage is a DC voltage; and wherein the power converter stage is a power factor correction stage operative to produce the DC voltage based on an alternating voltage supplied by a power source to the power factor correction stage.

17. The apparatus as in claim 1, wherein the flying capacitor is a first flying capacitor; and wherein the compensation circuitry includes first compensation circuitry including the first flying capacitor and second compensation circuitry including a second flying capacitor; and wherein the first compensation circuitry and the second compensation circuitry are disposed in parallel to generate the compensation current to the power converter stage.

18. The apparatus as in claim 17 further comprising:

a controller operative to selectively activate the first compensation circuitry and the second circuitry to produce the compensation current.

19. The apparatus as in claim 1, wherein the flying capacitor is a first flying capacitor;

wherein the input interface includes a first node and a second node operative to receive the output voltage generated by the power converter stage; and wherein the power converter stage includes: i) a third node connecting first switches and second switches in series between the first node and the second node, ii) a second flying capacitor coupled to the first switches and the second switches, iii) an inductor disposed in series between a power source and the third node.

20. A method comprising:

via an input interface, receiving an output voltage from a power converter stage;

via compensation circuitry including switch circuitry and a flying capacitor, producing a compensation current from the output voltage received from the power converter stage; and via an output interface, supplying the compensation current to the power converter stage, the compensation current reducing a magnitude of ripple associated with the output voltage.

* * * * *